United States Patent Office 3,842,156
Patented Oct. 15, 1974

3,842,156
NOVEL CATALYTIC PROCESS FOR THE PREPARATION OF POLYHALOHYPOCHLORITES
David E. Young, Denville,, Douglas E. Gould, Boonton, Lowell Ray Anderson, Parsippany, and William B. Fox, Morris Township, Morris County, N.J., assignors to Allied Chemical Corporation, New York, N.Y.
No Drawing. Filed Nov. 21, 1968, Ser. No. 777,920
Int. Cl. C01b 17/45; C07c 60/00, 71/00
U.S. Cl. 423—466
9 Claims

ABSTRACT OF THE DISCLOSURE

Polyhalohypochlorites of the formula: $R-(OCl)_n$ wherein $n$ is 1 or 2, R is a member selected from the group consisting of $SF_5-$ and an open chain perhaloalkyl group when $n$ is 1, R is an open chain perhaloalkylene group when $n$ is 2, with the provisos that the carbon atom or atoms attached to the —OCl group or groups are each bonded to no more than two other carbon atoms and that when $n$ is 2, the —OCl groups are separated by at least three carbon atoms; may be prepared by reacting $SOF_4$ and certain compounds containing carbonyl bonds with ClF in the presence of a catalyst selected from the group consisting of $HF$, $BF_3$, $AsF_5$, $SbF_5$.

CROSS-REFERENCES TO RELATED APPLICATIONS

Copending application of D. E. Gould et al. entitled "Novel Polyhaloorgano Hypochlorites and Process for the Preparation Thereof," Ser. No. 734,515, filed June 5, 1968, now U.S. Pat. 3,769,312.

Copending application of D. E. Gould et al. entitled "Pentafluorosulfur Hypochlorite," Ser. No. 734,891, filed June 6, 1968.

BACKGROUND OF THE INVENTION

Copending applications Ser. Nos. 734,515 and 734,891 mentioned supra describe novel polyhalohypochlorites which can ge be generically designated by the following formula: $R-(OCl)_n$ wherein $n$ is 1 or 2, R is a member selected from the group consisting of $SF_5-$ and an open chain YZ-perhaloalkyl group when $n$ is 1, R is an open chain YZ-perhaloalkylene group when $n$ is 2, Y and Z are substituents on the R moiety and may be the same or different electronegative groups, with the provisos that the carbon atom or atoms attached to the —OCl group or groups are each bonded to no more than two other carbon atoms and that when $n$ is 2, the R group contains at least three carbon atoms, and their preparation by reacting a starting material selected from the group consisting of $SOF_4$ and a compound containing at least four atoms including one or two carbonyl groups

associated other than in an aldehyde linkage, in which the non-carbonylic portion or portions of the molecule comprise open chain YZ-perhaloalkyl groups, or open chain YZ-perhaloalkylene groups, wherein Y and Z are substituents on the perhaloalkyl or perhaloalkylene groups and may be the same or different electronegative groups; with an inorganic chlorinating reagent containing a chlorine atom in a plus 1 oxidation state, which chlorine atom is attached to a more electronegative element in the presence of a catalyst comprising a metal fluoride selected from the group consisting of LiF, NaF, KF, RbF and CsF.

It is disclosed in these applications that these hypochlorites are useful as bleaching agents, as chlorinating agents capable of chlorinating unsaturated bonds in organic compounds and to replace hydrogen atoms in organic molecules, as fumigants effective against insects and other animal life, as polymerization initiators and as valuable intermediates for the synthesis of other compounds useful as initiators and as fumigants.

SUMMARY OF THE INVENTION

We have discovered new catalysts which can be substituted for the alkali metal fluoride catalysts of the process of copending applications, Ser. Nos. 734,515 and 734,891 discussed supra.

The novel catalysts are $HF$, $BF_3$, $AsF_5$, $SbF_5$. Use of these catalysts affords a number of operating advantages. All of these catalysts are cheaper than any of the alkali metal fluoride catalysts and accordingly can be used to lower product costs of the perhalohypochlorites. Further, since HF, $AsF_5$ and $BF_3$ are gases, use of such materials is advantageous in that they permit a completely gaseous continuous process. Moreover, the novel catalysts facilitate recovery and purification of the sought for hypochlorite products. This is because HF, $AsF_5$ and $BF_3$, being gases, can be readily pumped off. On the other hand, the solid alkali metal fluoride catalysts of copending applications Ser. Nos. 734,515 and 734,891 often require a filtration or decantation step for separation from the product.

DETAILED DESCRIPTION AND THE EXAMPLES

The R group in the hypochlorites of the formula $R-(OCl)_n$ may be $SF_5-$ or a straight chain or branched chain perhaloalkyl or perhaloalkylene group.

A preferred class of hypochlorites is that in which the minimum number of fluorine atoms is at least equal to one-half the total number of halogen atoms present in the molecule.

Subject to the indicated proviso in the definition of these compounds, the preferred number of carbon atoms in the R group is from 1-15. Compounds in which the R group contains more than 15 carbon atoms may be prepared, however, and exhibit the same properties.

As can be seen from formula I, when $n$ is 1, a class of mono-hypochlorites is defined. When $n$ is 2, a class of di-hypochlorites is defined. When $n$ is 1, the R group preferably contains from 1-6 carbon atoms and still preferably from 1-3 carbon atoms. When $n$ is 2, the R group preferably contains from 3-6 carbon atoms and still preferably from 3-5 carbon atoms.

Preferably all halogen atoms in the molecule are selected from F and Cl and still preferably, all the halogen atoms in the molecule are F.

Illustrative compounds which may be produced in accordance with the invention process are as follows:

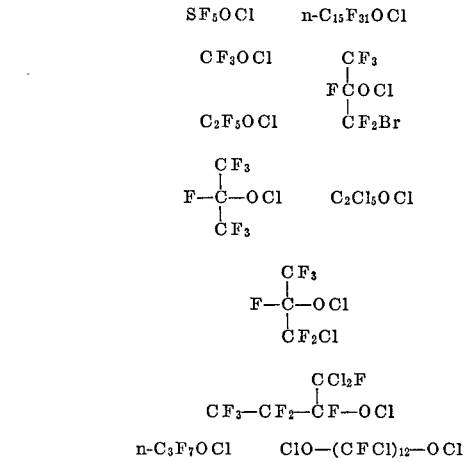

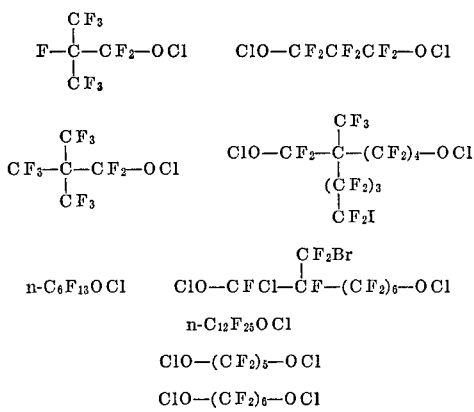

$$F-\underset{\underset{CF_3}{|}}{\overset{\overset{CF_3}{|}}{C}}-CF_2-OCl \qquad ClO-CF_2CF_2CF_2-OCl$$

$$CF_3-\underset{\underset{CF_3}{|}}{\overset{\overset{CF_3}{|}}{C}}-CF_2-OCl \qquad ClO-CF_2-\underset{\underset{CF_2I}{\underset{|}{(CF_2)_3}}}{\overset{\overset{CF_3}{|}}{C}}-(CF_2)_4-OCl$$

$$n\text{-}C_6F_{13}OCl \qquad ClO-CFCl-\overset{\overset{CF_2Br}{|}}{C}F-(CF_2)_6-OCl$$

$$n\text{-}C_{12}F_{25}OCl$$

$$ClO-(CF_2)_5-OCl$$

$$ClO-(CF_2)_6-OCl$$

The starting compound required to produce the SF₅OCl product is SOF₄.

Suitable starting compounds containing carbon-oxygen bonds are those which contain the necessary four atoms including one or two carbonyl groups associated other than in aldehyde linkages.

The non-carbonylic portions of the molecules of the starting compounds therefore include the R structure desired, and are perhalogenated in accordance with the definitions given herein. Monofunctional starting compounds produce the monohypochlorites. The corresponding dihypochlorites can be produced from difunctional carbonylic compounds such as diacids and diketones. A requirement for starting difunctional carbonylic compounds herein is that the two carbonylic functions be separated by at least one carbon atom. This will result in dihypochlorite products in which the two hypochlorite positions are separated by at least three carbon atoms. In some cases monohypochlorites can be produced optionally from difunctional compounds under conditions which cause molecular rearrangement. It can be seen, therefore, that suitable starting materials include such materials as $COF_2$, acids, acid halides and ketones. An illustration of the latter class of compounds is hexafluoroacetone.

The chlorinating reagent which is reached with the starting compound is ClF.

The HF, $AsF_5$, $SbF_5$ and $BF_3$ catalysts are commercially available materials.

The amount of catalyst employed is not critical. Very small amounts will serve to catalyze the reaction and very large amounts will not deleteriously affect the reaction. Generally, about .1–3 mols catalyst/mol of the $SOF_4$ or organic starting compound is employed with a preferred ratio being between about .1–.5 mol catalyst/mol of starting compound.

In some cases the carbonylic starting materials can react with the catalyst to effect replacement of halogen or other substituent with fluorine and accordingly the final hypochlorite product may not correspond precisely to the starting material employed. For example the acid chlorides can react with a fluorine containing catalyst to produce two types of products as illustrated by the following equations:

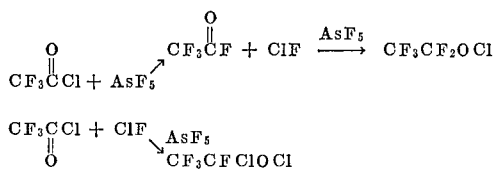

$$CF_3\overset{\overset{O}{\|}}{C}Cl + AsF_5 \nearrow \overset{\overset{O}{\|}}{CF_3CF} + ClF \xrightarrow{AsF_5} CF_3CF_2OCl$$

$$CF_3\overset{\overset{}{\|}}{\underset{O}{C}}Cl + ClF \xrightarrow{AsF_5} CF_3CFClOCl$$

Reaction temperatures vary over a very wide range. Generally, the reaction proceeds readily even at very low temperatures. For example, reaction with ClF will take place readily at —78° C. The reaction will proceed at temperatures up to 25° C. and higher, but in view of the ready reaction at lower temperatures, there is no advantage in supplying heat to the reaction. Preferred temperatures range from about —78° C. to 0° C. and most preferably in order of about —20° C. Depending on the particular reagent employed and the starting compound chosen, the optimum reaction temperature may vary within the above indicated ranges. Accordingly, the optimum temperature range for a particular reaction can be determined routinely.

Atmospheric, sub- or super-atmospheric pressures may be successfully employed in the practice of the invention process.

The reaction can be carried out with the reactants in liquid, vapor or solid phase. In the latter case any inert solvent is preferably employed, such as, for example, a halogenated hydrocarbon such as $CFCl_3$. All vapor phase reaction permits an easily controlled continuous reaction.

The following examples are intended to be illustrative of the invention and not limitative. Parts and percentages are by weight unless otherwise indicated. Products were identified by comparing infrared spectra with those of known samples of the hypochlorites produced in accordance with copending applications Ser. Nos. 734,515 and 734,891 mentioned supra.

EXAMPLE 1

A 30 ml. stainless steel "Hoke" cylinder was charged with 6.5 mmol of $COF_2$ and 6.5 mmol of ClF and the reaction mixture was allowed to stand for a period of 24 hours at —20° C. At the end of this period the mixture was analyzed. No evidence was found for the presence of $CF_3OCl$. Only the unreacted starting materials were identified. One mmol of anhydrous HF was then introduced into the cylinder and the resulting mixture was allowed to stand overnight at —20° C. At the end of this period the mixture was analyzed again and this time $CF_3OCl$ was identified as the only significant product of the reaction which had taken place.

EXAMPLE 2

A 30 ml. stainless steel cylinder was charged with 6 mmol of $COF_2$, 7 mmol of ClF and 1 mmol of $BF_3$. The resulting mixture was maintained at —20° C. overnight. At the end of this period the resultant product mixture was fractionated through traps set at —78° C. and —140° C. A product identified as being $CF_3OCl$ was isolated.

EXAMPLE 3

6 Mmol of hexafluoroacetone, 7 mmol of ClF and 1 mmol of $BF_3$ were condensed into a 30 ml. stainless steel "Hoke" cylinder. The resulting mixture was maintained at —20° C. for a period of about 24 hours. It was ascertained that $i$-$C_3F_7OCl$ was produced as a product of the reaction that took place between these materials.

EXAMPLE 4

2 Mmol of $COF_2$, 2 mmol of ClF and 0.5 mmol of $AsF_5$ were condensed into a 30 ml. stainless steel "Hoke" cylinder. The resulting mixture was maintained at —20° C. for about 24 hours. At the end of that period the product mixture was fractionated through a —130° C. cold trap. A 90% yield of essentially pure $CF_3OCl$ was recovered.

EXAMPLE 5

2 Mmol of $COF_2$, 2 mmol of ClF and 0.5 mmol of $SbF_5$ are reacted in a 30 ml. stainless steel "Hoke" cylinder for a period of about 24 hours. A good yield of essentially pure $CF_3OCl$ is recovered.

We claim:

1. In the process for preparing hypochlorites comprising reacting a starting compound selected from the group consisting of $SOF_4$ and a compound containing at least 4 atoms and having one of the following formulae:

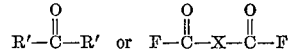

$$R'-\overset{\overset{O}{\|}}{C}-R' \quad \text{or} \quad F-\overset{\overset{O}{\|}}{C}-X-\overset{\overset{O}{\|}}{C}-F$$

wherein R' is fluorine or an open-chain perhaloalkyl group and X is an open chain perhaloalkylene group and wherein the minimum number of fluorine atoms is at least equal to one half the total number of halogen atoms, with ClF; the improvement which consists of catalyzing the reaction by introducing catalytic amounts of a compound selected from the group consisting of gaseous HF, gaseous $BF_3$, gaseous $AsF_5$ and $SbF_5$.

2. A process according to claim 1 in which the catalyst is selected from the group consisting of HF, $AsF_5$ and $BF_3$.

3. A process according to claim 1 in which the catalyst is HF.

4. A process according to claim 1 wherein all the halogen atoms in the starting compound are selected from F and Cl, wherein the number of fluorine atoms present is at least equal to one half the total number of fluorine and chlorine atoms in the molecule and in which the total number of carbon atoms in the starting compound is from 1–15.

5. A process according to claim 4 in which all the halogen atoms in the molecule are F.

6. A process according to claim 5 in which the starting compound is an acid halide.

7. A process according to claim 5 in which the starting compound is an acid halide containing 1–6 carbon atoms.

8. A process according to claim 5 in which the acid halide contains two 3–6 carbon atom carbonyl groups.

9. A process according to claim 5 in which the starting compound is $COF_2$.

References Cited
UNITED STATES PATENTS

| | | | |
|---|---|---|---|
| 2,702,306 | 2/1955 | Gall et al. | 260—650 |
| 3,582,292 | 6/1971 | Schack et al. | 23—367 |

OTHER REFERENCES

Lustig et al., "Journal Of The American Chemical Society," Vol. 89, pp. 2841–2843 (June 7, 1967).

Mellor, "Comprehensive Treatise On Inorganic And Theoretical Chemistry," Supplement II, Part I, p. 150 (1956).

Van der Werf, "Acids, Bases And The Chemistry Of The Covalent Bond," 1961, pp. 60–71.

MILTON WEISSMAN, Primary Examiner

U.S. Cl. X.R.

260—453, 694, 695; 423—467; 252—186; 424—162, 335